Patented July 21, 1931

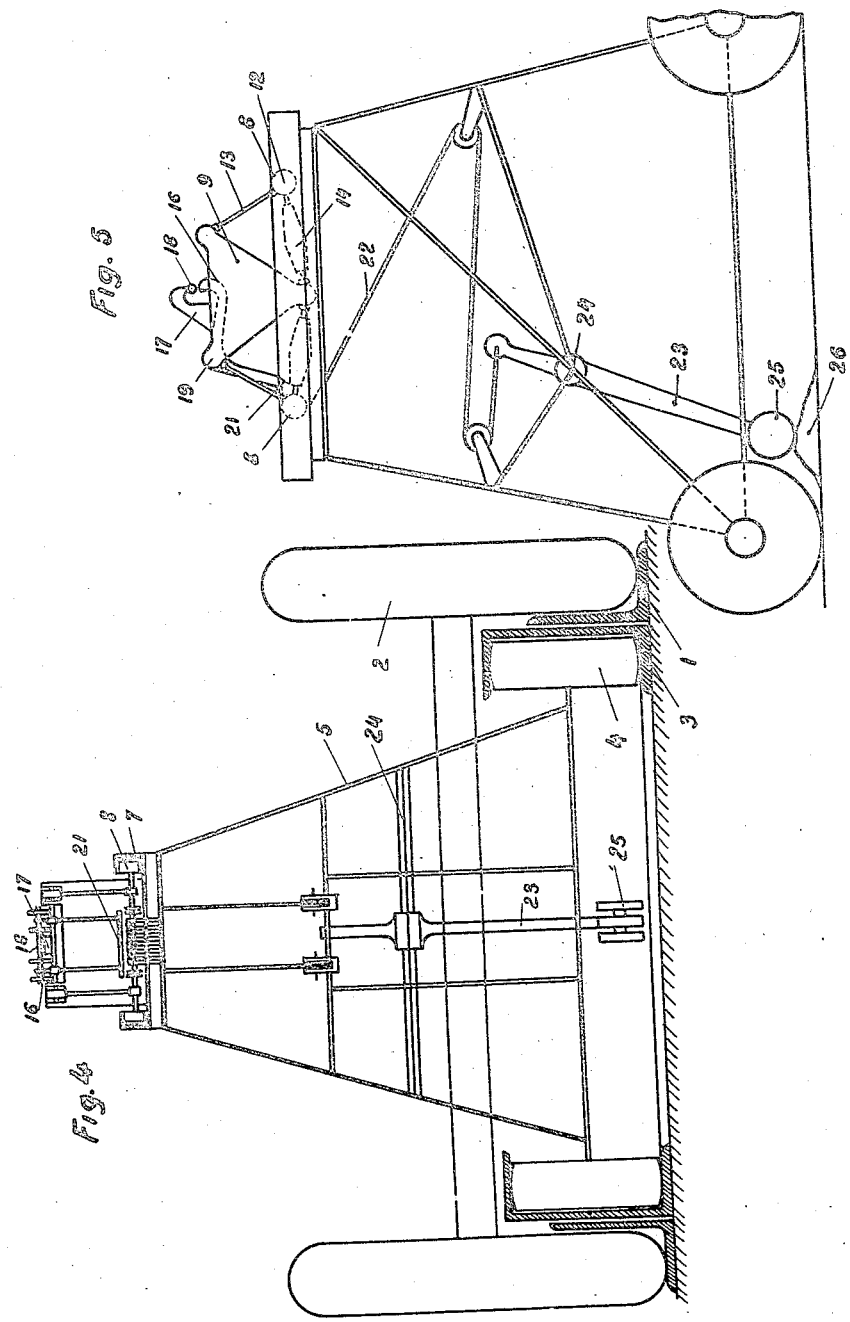

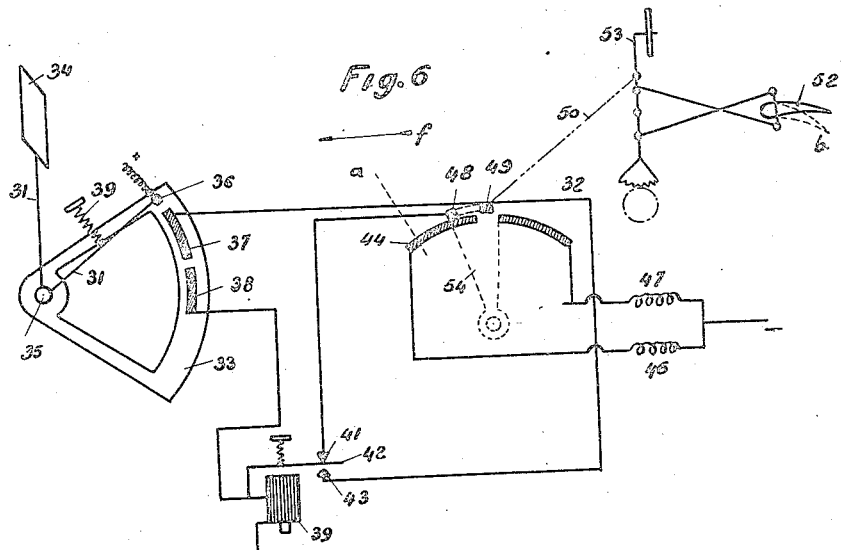
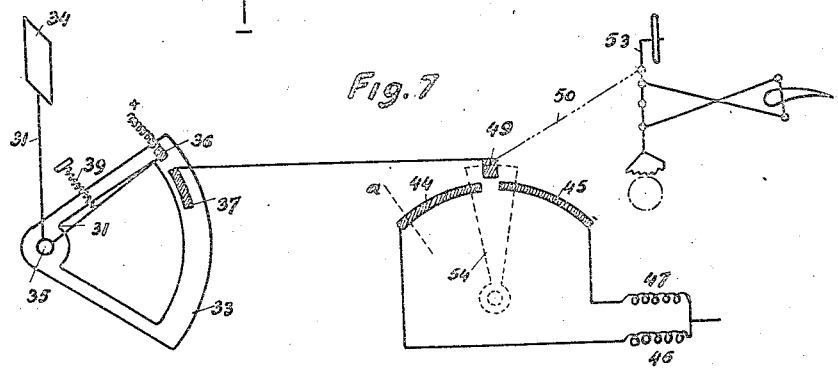
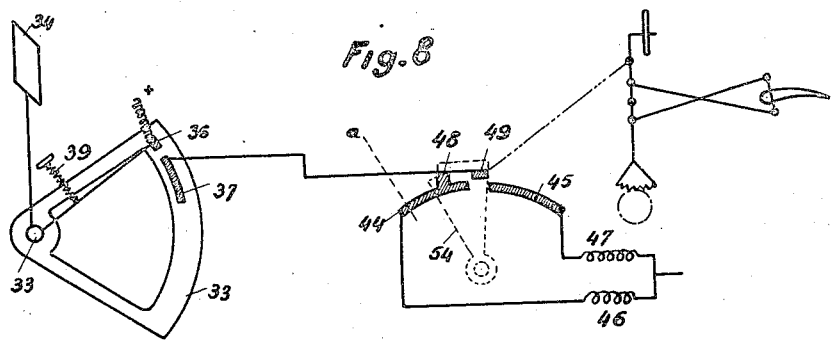

1,815,092

UNITED STATES PATENT OFFICE

RAOUL BERNADY, OF ISTRES, FRANCE, ASSIGNOR TO SOCIETE D'ETUDES ET DE CONSTRUCTION D'APPAREILS DE TELEMECANIQUE, OF PARIS, FRANCE, A CORPORATION OF FRANCE

METHOD AND DEVICE FOR THE AUTOMATIC STARTING OF AEROPLANES

Application filed January 7, 1931, Serial No. 507,240, and in France January 18, 1930.

My invention relates to a method and a device for automatically starting an aeroplane without any interference on the pilot's part, all the operations succeeding one another automatically after the initial release.

An aeroplane being first released with its motor running is started flying horizontally according to my invention through three successive steps.

(a) Launching i. e. a guided movement of the aeroplane over its raceway preventing its rotation round a vertical shaft while its incidence is greater than during flight;

(b) Automatic release of the aeroplane when it has covered a predetermined path;

(c) Stabilization of the aeroplane on its path of normal flight whether horizontal or slightly ascending, this stablization being provided automatically as soon as the aeroplane has reached a certain speed, through a part controlled by this speed such as an anemometer which controls the movements of the horizontal rudder. This stabilization causes normally the aeroplane to rise above ground.

Eventually in the case of uncentered aeroplanes there may be provided beyond the stabilization, an automatic breaking away motion consisting in a complementary rearing produced by the movement of the horizontal rudder during a certain time.

The device used for starting may consist according to the present invention in a track comprising two preferably independent guideways for the aeroplane and for a carriage carrying its tail at a suitable height for the condition relating to incidence to be fulfilled.

For release, I will use preferably a hooking arrangement or the like device mounted on the carriage and actuated from the track by a board or a track apparatus such as the usual contact making ramp.

Stabilization may be obtained with advantage through the anemometer controlling the brush contact acting on the height stabilizing means which may be of any type.

Several other features of the invention will appear from the description given hereunder by way of example, together with the drawings appended thereto.

Fig. 4 is a side view at 90° of Fig. 2.

Fig. 5 is a view similar to Fig. 2 but with the release hooks open.

Fig. 6 is a working diagram of the device for rising and breaking away from ground.

Figs. 7 and 8 are modifications of this device.

Figure 1:
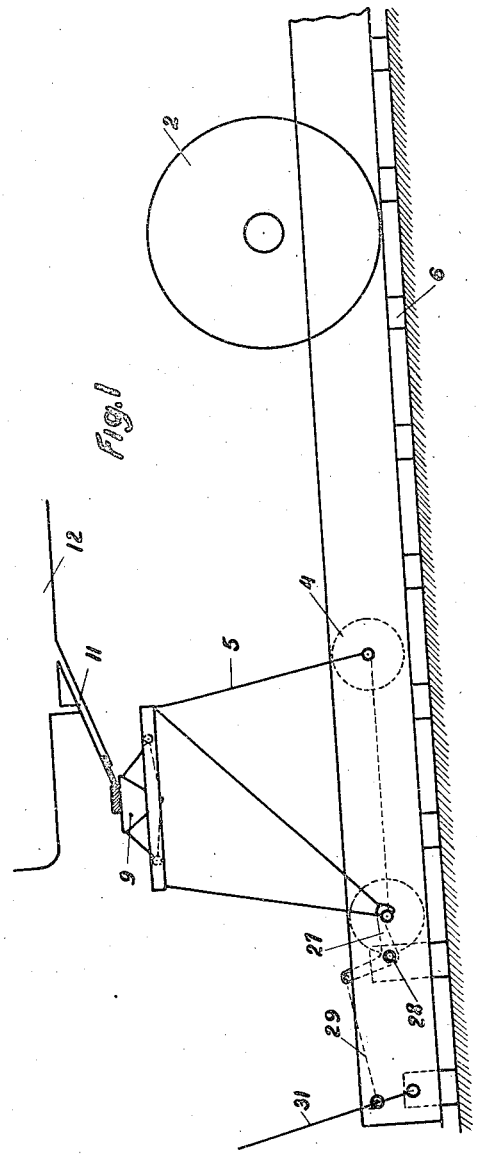
Fig. 1 is a side view of the starting device and of its guiding track.

The starting device comprises a track of a certain length formed by two shaped irons 1 and 3 carrying respectively the wheels 2 of the aeroplane and the wheels 4 of the carriage 5 (Fig. 4). The shaped irons are connected together by means of rivets with countersunk heads and are stayed by crossbars 6. The track comprises a succession of adjacent sections five or six meters long. The whole has a weight sufficient for preventing any transverse motion so as to resist the transversal reactions of the aeroplane if the latter has any tendency to rotate round a vertical axis.

The carriage 5 has the shape of a portion of a pyramid and comprises a framework of steel tubes. It rests on the four wheels 4 guided by their raceway 3. The upper part of this framework is formed of two longitudinal U-irons 7 serving as a guideway for rollers 8 carrying an auxiliary frame.

The roller frame comprises a central block 9 receiving the sprag 11 of the aeroplane 12 (Fig. 1) and connected with the two axles 12 for the rollers 8 through the agency of four systems of sloping bars 13 pivotally secured to the block and to the axles.

The axles 12 carry the rollers 8 and are connected through stretchers with the lower part of the block 9 whereby the slope of the bars 13 may be modified and therewith the height of the roller frame through the deformation of the lateral triangles 9—13—14. This allows the height of the sprag 11 of the aeroplane above ground to be adjusted whereby its incline is caused to be greater than for horizontal flight i. e. its tail is lower than when flying.

Figure 3:
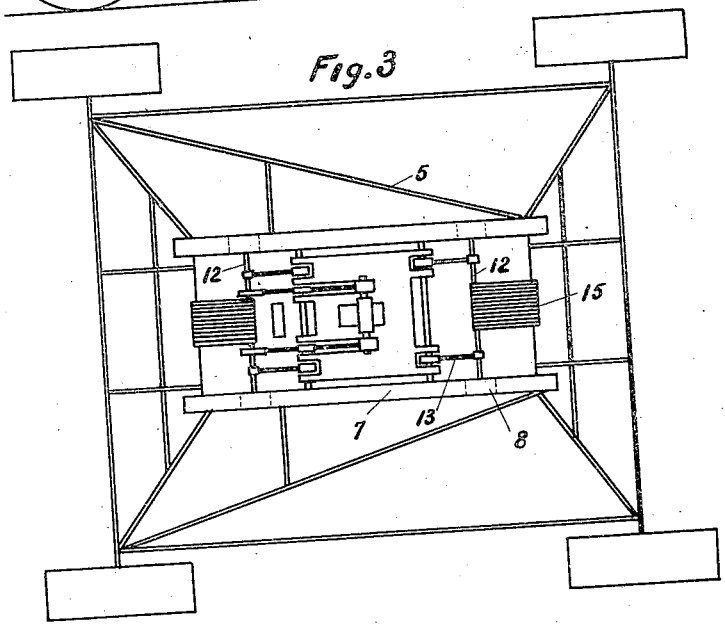
Fig. 3 is a view thereof from above.

The roller frame (Fig. 3) is elastically connected with the carriage 5 itself through yielding cables 15. In its inoperative position, the roller frame occupies the centre of the upper platform. This elastic connection damps of the shocks at the starting of the aeroplane and at the releasing of the sprag.

Figure 2:
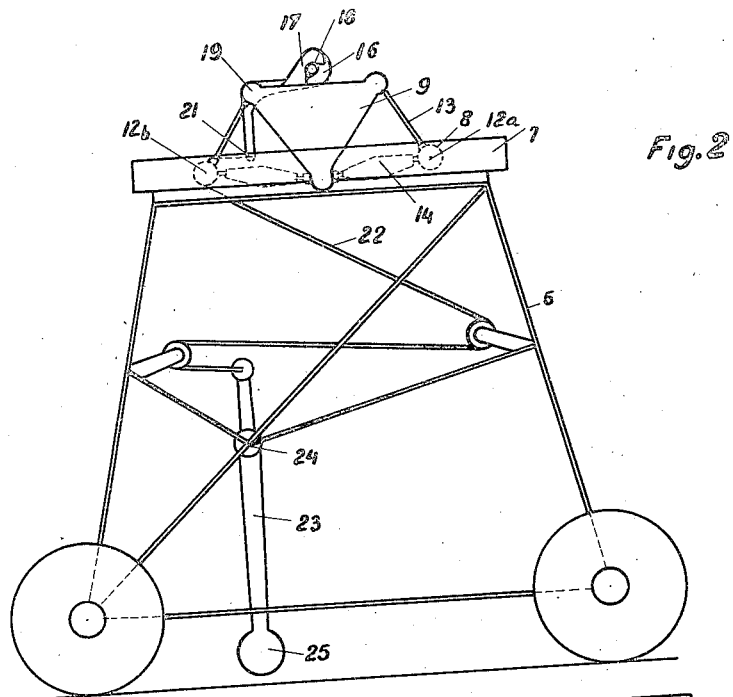
Fig. 2 shows the carriage in side view and at a larger scale.

The release device for the sprag comprises two hooks 16 and two stops 17. In the space between these hooks 16 and stops 17 is disposed a cross-bar 18 secured to the end of the sprag of the aeroplane. The hooks 16 pivot round a common sipndle 19 (Fig. 2) and their lower ends are interconnected through a cross-bar 21.

It is apparent that for releasing the sprag it is sufficient to draw out the cross-bar 21. This may be operated by the cables 22 one end of which is secured to the cross-bar 21 and the other to the upper part of the lever 23 pivoting round the axis 24 carried by the larger lower carriage 5. The lower end of the lever 23 carries the rollers 25 adapted to meet a stop. This stop is constituted by a plank or a contact making ramp 26 secured to the middle of the track sleepers at the point where it is desired to release the sprag (Fig. 5).

When the rollers 25 meet the stop 26, the lever 23 pivots round its axis and exerts on the cables 22 a traction which makes the hooks 16 rock and release the cross-bar 18 (Fig. 5).

In order that the locking system described may be reversible, it is sufficient to arrange in the making for the stress exerted by the cross-bar 18 on the hooks 16 to pass through the pivot 19 thereof whereby these hooks cannot rotate under the action of this stress.

The device for releasing the aeroplane at the start comprises (Fig. 1) hooks 27 pivoting round the axis 28 integral with the raceway. The hooks are secured by pairs to a cross-bar and connected by the connecting rods 29 to the lever 31. The lever 31 when actuated at the start releases the carriage 5.

To start the aeroplane it is sufficient to set the aeroplane motor running at full speed, to move the joy-stick forwards (this is preferable because if the speed of the aeroplane were not sufficient when it has completed its run its tail end would be held up through the flap of the horizontal rudder) and then to rock the lever 31 in order to release the carriage 5.

The aeroplane starts then running and when it arrives at the end of the track, the rollers 25 impinge against the ramp 26 and the lever 23 rocks, freeing through the agency of the hooks 16, the cross-bar 18 of the sprag 11. The aeroplane is thus set free and continues running straight ahead, while accelerating its speed. The carriage will continue rolling alone over its shaped irons 3 and is then stopped inside the limits of the raceway by a suitable dampers not shown in the drawings.

I will examine now the device for stabilizing the aeroplane and for making it rise above ground (Figs. 6 to 8).

It is desirable for the aeroplane to rise as soon as it has reached a sufficient speed with reference to the air. Any speedometer may therefore be used for sending the electric current at the desirable moment through the stabilizing apparatuses. An apparatus of the anemometer type is particularly suitable therefor.

I will first describe a device suitable for all aeroplanes even those which are badly centered (Fig. 6). In this arrangement the horizontal stabilization is followed by a period termed breaking away period during which the horizontal rudder enters a position giving the aircraft a mounting up position after which the latter returns into the conditions for horizontal stabilization.

A square 31 is pivotally secured to a spindle 35 integral with a segment 33. One of the arms of arms of this square carries a plate 34 submitted to the action of the air, the aeroplane moving in the direction of the arrow $f$; the other arm of the square carries a frictional contact 36 adapted to sweep the contacts 37, 38 on the segment 33.

The tensioned spring 39 secured on one hand to the second arm of the square and on the other to a stationary point urges the contact 36 away from the contacts 37, 38. The contact 36 is connected with one pole of an electric supply (not shown).

The contact 38 is connected with the electromagnetic relay 39 of a time switch. The electromagnet 39 is connected on the other hand with the other pole of the electric supply. This relay controls a contact 42 disposed between two terminals 41—43. A spring urges the contact 42 against terminal 41 when the electromagnet 39 is not excited. The terminal 41 is connected with the brush 48 which for horizontal flight contacts with the segment 44 of a stabilizing device which is stationary in space. This stabilizing device comprises two conducting segments 44—45 separated by a neutral point and a movable support 54 moving in unison with the joy-stick 53. To this support are secured the brushes 48 and 49 insulated from each other and from the mass. The previously mentioned brush 48 serves for breaking away purposes and stabilizes the aeroplane on a rearing angle with reference to horizontal flight which is sufficient to make the aeroplane rise above ground. The segments 44 and 45 are connected respectively with the electromagnets 46 and 47 adapted to start the auxiliary motor of a stabilizer of any type in opposite direction. This auxiliary motor controls through suitable intermediaries the horizontal rudder 52 connected mechanically with the joy-stick 53 connected in its turn as described through constraining means 50 with the support 54 of the horizontal stabilization means adapted to move the brushes 48 and 49 over the segments 44, 45.

The brush 49 on the support 54 is electrically connected with the contact 37 and with the terminal 43.

The working is as follows:

As stated the joy-stick 53 is rocked completely forwards prior to starting. The horizontal stabilization brush 49 comes thus into the position a and the rudder 52 into the position b. As soon as the aeroplane has reached a sufficient speed, the action of the air on the plate 34 forces the contact 36 against the contact 37. This closes the circuit feeding the brush 49 over the segment 44, current flows thus through the electromagnet 46 of the auxiliary motor returning the rudder to the position of horizontal flight; by reason of this control the brush 49 returns to its neutral position (in practice there is a certain number of oscillations round this neutral point which are not noticeable if all is properly adjusted), the flight is stabilized horizontally and the aeroplane increases its speed.

Owing to the increase of this speed, the contact 36 moves off the contact 37 and comes over the contact 38. The current is cut off in the stabilizing brush 49, the electromagnet 39 is excited. The current passes first through the contact 42 and the terminal 41 which are in contact and through the breaking away brush 48. As this brush is on the segment 44, the electromagnet 46 is excited which makes the rudder 52 enter a position corresponding to a certain rearing which may be varied by spacing more or less the brushes 48 and 49.

But after a very short time the contact 42 the movement of which is braked and delayed breaks the contact 42—41 and establishes the contact 42—43. The breaking away brush 48 ceases being excited and through the contact 42 and the terminal 43, the current is sent again into the stabilizing brush 49 which provides again horizontal stabilization conditions.

For certain aeroplanes which are particularly well centered and adjusted, the operation of breaking away (Fig. 7) may be omitted.

In this case there is only one contact 37 electrically connected with the brush 49 for horizontal stabilization, this brush being mechanically connected through the constraining means 50 with the joy-stick 53.

With this arrangement the aeroplane when it has left the launching track builds up speed and the anemometer becomes operative; the contact 36 comes into contact with the contact 37 whereby electric current is fed to the brush 49 for horizontal stabilization. As previously, the joy-stick is supposed to have been moved forwardly with the brush 49 in the position a. The current will therefore flow through the segment 44 and excite the raising electromagnet 46, bringing the joy-stick 53 into the position for stabilizing the aeroplane on its trajectory of horizontal flight.

If the aeroplane is properly centered it will continue building up speed and when the latter has reached a certain value, it will rise above ground.

Fig. 8 illustrates the theoretical principle underlying a device suitable for a certain aeroplane the balance of which is not quite perfect but for which the breaking away movement has been however omitted 37 is electrically connected with the breaking away brush 48 disposed to the front of the brush 49 for horizontal stabilization, which latter is not operative during the whole period of launching.

After it has left the track, the aeroplane continues running and the anemometer causes the contact 36 to meet the contact 37 whereby current is fed to the brush 48. As the joy-stick was originally directed forwardly with the brush 48 in the position a, the auxiliary motor starts under the action of the electromagnet 46; the aeroplane is stabilized with a greater incidence than for horizontal flight, this incidence depending on the angular distance between the brushes 48 and 49. The aeroplane offering a greater incidence will rise more easily above ground.

The speedometer might also act on a contact disposed on the auxiliary motor itself instead of on the stabilizing device but this allows only predetermined angles to be given to the aeroplane and is consequently not advisable; it is preferable to stabilize the aircraft.

There may also be provided a mechanical connection between the arm carrying the anemometer surface and the brush of the stabilizer.

What I claim is:

1. A method for automatically starting an aeroplane consisting in constraining this aeroplane to run forwardly with a slightly greater incidence than in flight, guiding it laterally during this run, releasing it automatically from said constraint and stabilizing it automatically as soon as it has a sufficient speed.

2. A method for automatically starting an aeroplane consisting in constraining this aeroplane to run forwardly with a slightly greater incidence than in flight, guiding it laterally during this run, releasing it automatically from said constraint, giving automatically during a predetermined period a stabilized rearing movement to the aeroplane and stabilizing it automatically as soon as it has a sufficient speed.

3. A device for launching an aeroplane comprising a track for the wheels of the aeroplane, a carriage running over the same track and to which the sprag of the aeroplane is removably secured, a stop disposed on the track and adapted to release the aeroplane sprag from the carriage when the latter has arrived over said stop and means carried by the aeroplane for stablizing it as soon as it has reached a predetermined speed.

4. A device for launching aeroplanes comprising a wheeled carriage to which the sprag of the aeroplane is removably secured, a double track over the elementary tracks of which the aeroplane wheels and the carriage wheels are adapted to run, a device disposed on the track and adapted to release the aeroplane sprag from the carriage when the latter has arrived over said device and means carried by the aeroplane for stabilizing it as soon as it has reached a predetermined speed.

5. In a device as claimed in claim 3 the provision of a hand controlled device adapted to hold the carriage in its starting position.

6. A device for launching an aeroplane comprising a track for the wheels of the aeroplane, a carriage running over the same track, a roller frame mounted yieldingly on the carriage at an adjustable height and to which the sprag of the aeroplane is removably secured, a stop disposed on the track and adapted to release the aeroplane sprag from the carriage when the latter has arrived over said stop and means carried by the aeroplane for stabilizing it as soon as it has reached a predetermined speed.

7. A device for launching an aeroplane comprising a track for the wheels of the aeroplane, a carriage running over the same track, a frame mounted yieldingly on the carriage including rollers, uprights pivotally secured to the roller axles, stretchers connected with the said axles and a support of adjustable height held by the stretchers pivotally secured to the uprights and to which the sprag of the aeroplane is removably secured, a stop disposed on the track and adapted to release the aeroplane sprag from the carriage when the latter has arrived over said stop and means carried by the aeroplane for stabilizing it as soon as it has reached a predetermined speed.

8. A device for launching an aeroplane comprising a track for the wheels of the aeroplane, a carriage running over the same track, a roller frame mounted yieldingly on the carriage at an adjustable height and to which the sprag of the aeroplane is removably secured, a stop disposed on the track, hooks pivotally carried by the sprag carrying frame, a cross-bar secured to the sprag of the aeroplane and engaged by the hooks, a lever pivotally secured to the carriage and controlled by the stop on the track, means whereby said lever is adapted when operated by the stop to release the hooks from the cross-bar and means carried by the aeroplane for stabilizing it as soon as it has reached a predetermined speed.

9. A device for launching an aeroplane comprising a track for the wheels of the aeroplane, a carriage running over the same track, a roller frame mounted yieldingly on the carriage at an adjustable height and to which the sprag of the aeroplane is removably secured, a stop disposed on the track, hooks pivotally carried by the sprag carrying frame, a cross-bar secured to the sprag of the aeroplane and engaged by the hooks, the pressure of the cross-bar of the sprag on the hooks passing through the pivotal axis of these hooks, a lever pivotally secured to the carriage and controlled by the stop on the track, means whereby said lever is adapted when operated by the stop to release the hooks from the cross-bar and means carried by the aeroplane for stabilizing it as soon as it has reached a predetermined speed.

10. A device for launching an aeroplane comprising a track for the wheels of the aeroplane, a carriage running over the same track and to which the sprag of the aeroplane is removably secured, a stop disposed on the track and adapted to release the aeroplane sprag from the carriage when the latter has arrived over said stop, dampers beyond the stop lying on the track for stopping the carriage and means carried by the aeroplane for stabilizing it as soon as it has reached a predetermined speed.

11. A device for launching an aeroplane comprising a track for the wheels of the aeroplane, a carriage running over the same track and to which the sprag of the aeroplane is removably secured, a stop disposed on the track and adapted to release the aeroplane sprag from the carriage when the latter has arrived over said stop, an anemometer and means controlled thereby carried by the aeroplane for stabilizing it as soon as it has reached a predetermined speed.

12. A device for launching an aeroplane comprising a track for the wheels of the aeroplane, a carriage running over the same track and to which the sprag of the aeroplane is removably secured, a stop disposed on the track and adapted to release the aeroplane sprag from the carriage when the latter has arrived over said stop, an anemometer and an automatic stabilizer controlled thereby carried by the aeroplane for stabilizing it as soon as it has reached a predetermined speed.

13. A device for launching an aeroplane comprising a track for the wheels of the aeroplane, a carriage running over the same track and to which the sprag of the aeroplane is removably secured, a stop disposed on the track and adapted to release the aeroplane sprag from the carriage when the latter has arrived over said stop, an anemometer carried by the aeroplane, a contact actuated by the anemometer a contact cooperating with this contact when the anemometer is moved to a predetermined extent, an electric circuit closed by said contacts, a segment including two contacts separated by a neutral point, two electromagnets connected respectively with the latter contacts, an auxiliary motor controlled by the electromagnets and adapted to increase and reduce the incidence of the aeroplane according to the electromagnet controlling it and a brush mechanically controlled in unison with the horizontal rudder of the aeroplane rubbing over the two-contact segment and inserted therewith and the corresponding electromagnets in parallel in the circuit.

14. A device for launching an aeroplane comprising a track for the wheels of the aeroplane, a carriage running over the same track and to which the sprag of the aeroplane is removably secured, a stop disposed on the track and adapted to release the aeroplane sprag from the carriage when the latter has arrived over said stop an anemometer, carried by the aeroplane, a contact actuated by the anemometer a contact cooperating with this contact when the anemometer is moved to a predetermined extent, an electric circuit closed by said contacts, a segment including two contacts separated by a neutral point, two electromagnets connected respectively with the latter contacts, an auxiliary motor controlled by the electromagnets and adapted to increase and reduce the incidence of the aeroplane according to the electromagnet controlling it, a brush mechanically controlled in unison with the horizontal rudder of the aeroplane rubbing over the two-contact segment and inserted therewith and the corresponding electromagnets in parallel in the circuit, an auxiliary breaking away brush rubbing over the two-contact segment to the rear of the first brush, an auxiliary contact cooperating with the anemometer contact beyond the previously mentioned cooperating contact, an electric connection of this auxiliary contact with the auxiliary brush and a time switch breaking automatically after a predetermined time this connection and connecting the first brush ensuring horizontal stabilization with the auxiliary contact.

15. A device for launching an aeroplane comprising a track for the wheels of the aeroplane, a carriage running over the same track and to which the sprag of the aeroplane is removably secured, a stop disposed on the track and adapted to release the aeroplane sprag from the carriage when the latter has arrived over said stop, an anemometer carried by the aeroplane, a contact actuated by the anemometer, a contact cooperating by the anemometer, a contact cooperating with this contact when the anemometer is moved to a predetermined extent, an electric circuit closed by said contacts, a segment including two contacts separated by a neutral point, two electromagnets connected respectively with the latter contacts, an auxiliary motor controlled by the electromagnets and adapted to increase and reduce the incidence of the aeroplane and a set of two brushes mechanically controlled in unison with the horizontal rudder of the aeroplane, rubbing over the two-contact segment and the rearmost of which is connected in the circuit with the contact cooperating with the anemometer contact.

In testimony whereof I have affixd my signature.

RAOUL BERNADY.